United States Patent Office 3,666,509
Patented May 30, 1972

---

3,666,509
DRY MIX FOR MAKING HEAVY DUTY WHITE CONCRETE
Howard J. Horvitz, 21800 Shaker Blvd., Shaker Heights, Ohio 44122
No Drawing. Filed Sept. 8, 1970, Ser. No. 70,549
Int. Cl. C04b 31/02
U.S. Cl. 106—98         19 Claims

ABSTRACT OF THE DISCLOSURE

A dry mix for making white concrete which includes approximately 18 to 35% white cement, approximately 63 to 80% aggregate and approximately 0.5 to 5% titanium dioxide, the aggregate having a fineness modulus approximately in the range 3.3 to 4.2.

BACKGROUND OF THE INVENTION

White portland cement is well known in the art and as the name implies is a very light colored, practically white cement. Iron and manganese oxide are the compounds primarily responsible for the dark color of regular gray portland cement and white cement is characterized by its low iron and manganese oxide content. The lack of iron also accounts for the non-staining qualities of white cement. No particular discussion appears necessary concerning the process for making white portland cement as it is well known in the art and a commercial grade is used in this invention. White portland cement is available in Types I, III, I-A, III-A, waterproofed and shrinkage compensated. For use in the instant invention the following are preferred in sequence: Type III, Type I and shrinkage compensated.

Another particular cement type binder which may be used in this invention is white calcium aluminate. Its use is well known in the art. It is merely substituted for commercial white portland cement when desired.

BRIEF DESCRIPTION OF THE INVENTION

A dry mix is prepared including white cement, aggregate and a white pigment additive, titanium dioxide. The titanium dioxide is substantially free of impurities, is white in color and increases the whiteness of the resulting concrete.

The prime reasons for having white floors in industrial applications is the clean appearance and light reflectivity. In industrial facilities light usually comes from the ceiling, either from electrical illumination or skylights. White floors prepared by the method of this invention will increase the reflected light by as much as 60% as compared to gray concrete floors. This provides an increase in light below shelving, platforms or other opaque structures. It also increases the brightness above the opaque structures but this is usually not a problem. Providing adequate lighting is particularly important in areas involving vehicles, for example, the large Boeing 747 aircraft. The wings and fuselage of the plane tend to create large shadow areas when placed in hangers or even when parked on runways. With the white concrete flooring of this invention, light will be reflected from the floor, thus minimizing the shadow area and making it brighter for mechanics, etc. who must work under the wing or fuselage.

Aggregate is always used with the white cement and should be light in color, preferably translucent or white-colored. Silica is used under ordinary circumstances. However, granite, flint and other wear resistant light colored aggregate can be used. Where it is desirable to have a non-slip surface special aggregates and finishing techniques are used. Fused aluminum oxide ($Al_2O_3$), herein referred to as alumina, has been found to be an extremely useful surface aggregate for minimizing the slippery nature of the usual white concrete floors.

PREFERRED EMBODIMENTS

To produce a white, non-dusting, long wearing, easy to clean concrete floor which offers maximum light reflectivity, a dry mixture of white portland cement or white calcium aluminate is mixed with appropriate aggregate and approximately 0.5 to 5% titanium dioxide. The mixture and the resulting floor may be used in continuously wet areas whether they be interior or exterior.

Special 0.0% water absorption aggregate plus high surface density permit use in food processing applications. Clearly, porous silica or alumina are available as aggregate but such are not suitable for the floors of the instant invention. The minimum absorption characteristic minimizes staining and darkening of the floor with age. The high surface density is provided by maximizing the aggregate at the wear surface. Because the aggregate is relatively hard, it resists wear and the dust which occurs with ordinary concrete floors is largely absent. The means for minimizing "dusting" will be explained subsequently.

The dry mixture above defined is preferably applied as an upper facing to a previously laid standard gray cement-aggregate-water combination for the obvious reason that gray cement is cheaper than white cement. For example, where a 5" floor is desired the white concrete topping may be no more than ¼" thick if desired, while the gray concrete may be 4¾" thick. It is clear that white cement could be used for the whole 5" slab if desired.

As with any preparations for laying a concrete floor the base is initially prepared in the standard manner. The gray cement-aggregate-water mixture is then poured in a conventional manner. It is screeded to form a relatively flat substrate and is allowed to stand until the bleed water disappears. The flat substrate is then floated and a dry mixture of approximately 18 to 35% white cement, approximately 63 to 80% aggregate and approximately 0.5 to 5% titanium dioxide is applied dry to the flat surface in a uniform manner.

In the preferred embodiment approximately ⅔'s of the total amount of the white mixture is used as a first layer and is deposited by the well known "shake" means of application. The first layer is allowed to absorb water from the substrate and then power floated. Next the remaining approximately ⅓ of the white mixture is applied by the shake method and allowed to absorb water. Power floating, trowelling to the desired finish and curing completes the work.

The aggregate must be as strong as the set cement because, as with a chain, failure occurs first at the weakest link. A properly trowelled white concrete surface prepared according to this invention develops a surface compressive strength of approximately 10,000 p.s.i.

Silica aggregate being rounded or having subangular fractured faces is preferred with a fineness modulus of 3.3 to 3.7 having a straight line design gradation with approximately a 20% void content. It is important that a straight line gradation be maintained to insure that the wear surface be of maximum density. The fines fill in around the larger aggregate and minimize the surface of cement binder exposed at the wear surface.

As is well known to those in the terrazzo or concrete floor industry, the wearing ability of a floor is based almost entirely upon the aggregate itself. The cement surrounding the pieces of aggregate is merely an adhesive binder to hold the aggregate together. Thus, in this invention it is particularly desirable to have a very dense wear surface and a particular cement-aggregate mixture is necessary. With a maximized aggregate density at the wear surface there is less "dusting" due to the wear on the cement binder itself.

The maximum and minimum sizes of aggregate are critical as is the need for a straight line gradation. In screening the aggregate to prepare it, the maximum size should be retained on the 8 mesh screen and the minimum size should be retained on the 70 mesh screen.

Light colored silica aggregate is used most often. However, if it is particularly desired to have a non-skid surface, alumina aggregate ($Al_2O_3$) is mixed with the silica or else substituted for the silica entirely. The particular properties of alumina have been found to be particularly beneficial in this combination and provide a good friction surface for most uses.

Silica and alumina are both extremely strong in compression and can serve as a very useful aggregate. Silica is familiar as an aggregate and is often used. However, alumina is less familiar as it is more expensive. Consequently, its properties were not so well documented heretofore.

The titanium dioxide pigment is merely a whitener and adds nothing to the strength or wearing ability of the concrete floor. It is often combined with a wetting agent to insure proper dispersion in the concrete matrix. When more than 5% titanium dioxide is used in the mixture the compressive strength of the floor begins to deteriorate and when less than 0.5% is used the whitening effect is minimal and has little practical effect. From a practical standpoint about 2% titanium dioxide is preferred. It is desirable to grind the titanium dioxide with the cement to assist in proper blending of the mixture although other techniques are within the scope of this invention.

As indicated, alumina is used as an aggregate when a non-slip surface is necessary. However, in the two shake method it is not necessary to use alumina exclusively. Because silica is less expensive, in some instances it is used in the first applied shake and alumina in the second shake. In this manner the upper wear surface will be composed primarily of the "non-slip" alumina aggregate. In other instances mixtures of alumina and silica aggregate are used satisfactorily.

A monolithic application of the white topping to the gray concrete substrate may be made in the following manner. After (1) the gray cement is applied in the conventional manner, (2) the bleed water allowed to disappear and (3) the slab will support the weight of a cement finisher with less than 1/8" foot depression, the white cement facing is applied. The dry white cement-aggregate-titanium dioxide mixture is combined with approximately 10 to 12 pints of water per 90 pounds of dry mixture and applied to the base slab by trowelling. Strips are used as guides of thickness (i.e., 1/4") and the white topping is screeded over the surface. When the surface will support a finisher and a power float the surface is floated and trowelled to the desired finish.

Coarser aggregate is used in this instance having a fineness modulus in the range 3.8 to 4.2 with the same physical characteristics previously mentioned.

In a dry shake application it is preferred that the shake be applied at about 1½ pounds per square foot. With a 1/4" monolithic application the preferred weight is about 3.6 pounds per square foot.

In order to get the proper dispersion of the materials in a cement mixture where a pigment is used it is often desirable to use a dispersing agent and a preferred agent is calcium ligno sulphonate. Only a small amount is necessary, 0.01 to 0.07 percent is sufficient. As indicated, some suppliers include a dispersing agent with the titanium dioxide. It is speculated that the dispersing agent may contribute in part to the deterioration of the strength of the concrete where more than 5% $TiO_2$ is incorporated in the dry mix; however, this is not known with certainty.

The invention claimed is:

1. A dry mix for making white concrete consisting essentially of approximately 18–35 percent white cement, approximately 63–80 percent aggregate and approximately 0.5–5 percent titanium dioxide, the aggregate having a fineness modulus approximately in the range 3.3–4.2.

2. The dry mix of claim 1 wherein the aggregate comprises a mixture of silica and alumina.

3. The dry mix of claim 2 wherein the aggregate is approximately of a size which will be held on screens between 8 mesh and 70 mesh with approximately a straight line gradation.

4. The dry mix of claim 1 wherein the aggregate comprises alumina.

5. The dry mix of claim 4 wherein the aggregate is approximately of a size which will be held on screens between 8 mesh and 70 mesh with approximately a straight line gradation.

6. The dry mix of claim 1 including 0.01–0.07 percent calcium ligno sulphonate.

7. The dry mix of claim 1 wherein the aggregate comprises light colored silica.

8. The dry mix of claim 7 wherein the aggregate is approximately of a size which will be held on screens between 8 mesh and 70 mesh with approximately a straight line gradation.

9. A dry mix for making white concrete consisting essentially of approximately 18–35 percent white cement, approximately 63–80 percent aggregate and approximately 0.5–5 percent titanium dioxide, the aggregate having a fineness modulus approximately in the range 3.3–3.7.

10. The dry mix of claim 9 wherein the aggregate comprises light colored silica.

11. The dry mix of claim 10 wherein the aggregate is approximately of a size which wil be held on screens between 8 and 70 mesh with approximately a straight line gradation.

12. The dry mix of claim 9 wherein the aggregate comprises a mixture of silica and alumina.

13. The dry mix of claim 12 wherein the aggregate is approximately of a size which will be held on screens between 8 mesh and 70 mesh with approximately a straight line gradation.

14. The dry mix of claim 9 wherein the aggregate comprises alumina.

15. The dry mix of claim 14 wherein the aggregate is approximately of a size which will be held on screens between 8 mesh and 70 mesh with approximately a straight line gradation.

16. A dry mix for making white concrete consisting essentially of approximately 18–35 percent white cement, approximately 63–80 percent aggregate and approximately 0.5–5 percent titanium dioxide, the aggregate having a fineness modulus approximately in the range 3.8–4.2.

17. The dry mix of claim 16 wherein the aggregate comprises light colored silica.

18. The dry mix of claim 16 wherein the aggregate comprises a mixture of silica and alumina.

19. The dry mix of claim 16 wherein the aggregate comprises alumina.

References Cited

UNITED STATES PATENTS

| | | | |
|---|---|---|---|
| 3,242,242 | 3/1966 | Bournique | 106—97 |
| 3,151,995 | 10/1964 | Nemeth | 106—89 |
| 3,068,109 | 12/1962 | Rodeffer | 106—101 |
| 2,758,033 | 8/1956 | Burney et al. | 106—97 |

OTHER REFERENCES

Lea and Desch, "The Chemistry of Cement and Concrete," Edw. Arnold and Sons, pp. 461–463, 480–482 (1956).

Taylor, W. H., "Concrete Technology and Practice," American Elsevier, pp. 20, 50, 286, 352, 390–391 (1965).

TOBIAS E. LEVOW, Primary Examiner

W. T. SCOTT, Assistant Examiner

U.S. Cl. X.R.

106—90, 97, 101